US006546351B1

(12) United States Patent
Haycock et al.

(10) Patent No.: US 6,546,351 B1
(45) Date of Patent: Apr. 8, 2003

(54) NOTE-SPECIFIC CURRENCY PROCESSING

(75) Inventors: Richard G. Haycock, Cobham (GB); Sohail Kayani, Irving, TX (US)

(73) Assignee: Currency Systems International, Irving, TX (US)

( * ) Notice: Subject to any disclaimer, the term of this patent is extended or adjusted under 35 U.S.C. 154(b) by 0 days.

(21) Appl. No.: 09/620,099

(22) Filed: Jul. 20, 2000

(51) Int. Cl.[7] .................................................. G06K 9/00

(52) U.S. Cl. ......................... 702/127; 702/81; 702/183; 382/135

(58) Field of Search ............................ 702/127, 33, 35, 702/36, 38–40, 57, 65, 81–84, 108, 128, 155, 159, 183, 188, FOR 155, FOR 170, FOR 171, FOR 134, FOR 137, FOR 141, FOR 145, FOR 147, FOR 148, FOR 103, FOR 104, FOR 123, FOR 124, FOR 125; 703/1; 209/534, 555, 576, 580–582, 587, 588, 577; 250/559.39, 4, 359.49, 42, 556, 559.11, 559.01, 559.06; 194/206, 207; 235/454, 379, 449, 493, 375, 376, 380; 73/159; 382/112, 135, 219, 321, 323; 356/237.1, 71; 902/7

(56) References Cited

U.S. PATENT DOCUMENTS

| | | | | | |
|---|---|---|---|---|---|
| 3,759,382 | A | | 9/1973 | Walkley et al. | 209/534 |
| 3,782,543 | A | | 1/1974 | Martelli et al. | 209/555 |
| 3,916,194 | A | | 10/1975 | Novak et al. | 250/338.1 |
| 3,932,272 | A | | 1/1976 | Carnes, Jr. et al. | 209/534 |
| 4,025,420 | A | | 5/1977 | Horino | 209/534 |
| 4,255,057 | A | | 3/1981 | Williams | 356/435 |
| 4,365,508 | A | | 12/1982 | Loftus | 73/159 |
| 4,592,090 | A | | 5/1986 | Curl et al. | 382/135 |
| 4,710,963 | A | | 12/1987 | Chapman et al. | 382/112 |
| 4,723,072 | A | | 2/1988 | Naruse | 235/454 |
| 5,417,316 | A | | 5/1995 | Harbaugh | 194/206 |
| 5,529,211 | A | | 6/1996 | Ishiwata | 271/274 |
| 5,545,885 | A | | 8/1996 | Jagiellnski | 235/449 |
| 5,692,067 | A | | 11/1997 | Raterman et al. | 382/135 |
| 5,875,259 | A | * | 2/1999 | Mennie et al. | 382/135 |
| 5,917,930 | A | * | 6/1999 | Kayani et al. | 382/135 |
| 5,923,413 | A | * | 7/1999 | Laskowski | 356/71 |
| 5,955,741 | A | | 9/1999 | Kayani | 250/559.11 |
| 6,040,584 | A | | 3/2000 | Liu et al. | 250/559.11 |
| 6,101,266 | A | * | 8/2000 | Laskowski et al. | 382/135 |
| 6,237,739 | B1 | * | 5/2001 | Mazur et al. | 194/207 |

FOREIGN PATENT DOCUMENTS

| | | | |
|---|---|---|---|
| EP | 0 302 458 | | 2/1988 |
| WO | WO 99/05624 | * | 2/1999 |

* cited by examiner

*Primary Examiner*—Hal Wachsman
(74) *Attorney, Agent, or Firm*—Colin P. Cahoon; Carstens, Yee & Cahoon, LLP

(57) ABSTRACT

A method for processing currency notes from various sources using source-specific processing templates. For each note processed, the system detects at least one unique identifier that may be used to associate the note with a particular note printing source. In addition, for each note processed, the invention detects various note features used to make note processing determinations. For each detected note feature, processing templates are created that correspond to each different note printing source. Note processing determinations are made by applying the appropriate source-specific processing template to each detected note feature. Source-specific variations in note features are taken into account when note processing determinations are made regarding note authenticity, fitness, accounting, and tracking.

27 Claims, 2 Drawing Sheets

| | A | | B | |
|---|---|---|---|---|
| | ACCEPTABLE | UNACCEPTABLE | ACCEPTABLE | UNACCEPTABLE |
| PAPER COLOR | </=8 | >8 | <6 | >/=6 |
| INK COLOR | <5 | >/=5 | </=6 | >6 |

NOTE-SPECIFIC CURRENCY PROCESSING

BACKGROUND OF THE INVENTION

1. Technical Field

The present invention relates to processing of mixed currency notes from different sources and having different quality attributes for identical denominations and series. Information is gathered from currency, in the form of paper or other substrate notes, by the automated detection of certain note features. The information is used for processing purposes, to sort the notes by denomination, and to make determinations concerning the fitness and authenticity of the notes. Note processing determinations are made independent of any note-to-note variations among notes of the same issue (i.e., denomination and series) in the features attributable to different note printing sources.

2. Description of Related Art

Automated, high-volume currency processing is a growing international industry affecting numerous aspects of the distribution, collection, and accounting of paper or other substrate currency. Currency processing machines, such as those manufactured and distributed by Currency Systems International, Inc. of Irving, Tex., can be designed to detect numerous features of currency notes as the notes pass detectors on a conveyor. The information gathered is used for accounting, sorting, and determining note fitness and authenticity. In order to determine if an individual note should be rejected, and thereby taken out of circulation, or sorted for future distribution, information gathered by detecting one or more note features can be compared to a set standard for fitness or authenticity.

FIG. 1 is a perspective view of a prior art currency processing machine. The machine is loaded with a batch feed of currency 12 prior to starting the currency processing cycle. Single notes are fed from the batch feed of currency 12 and then travel on a high-speed conveyor past several different detectors before being deposited in one of several sort bins 14. The detectors collect information from the notes. The information may then be used by the processing machine for accounting purposes, or for making note processing determinations. Such note processing determinations include separating and sorting the notes according to predetermined fitness levels, authenticating features, and denomination. For example, at the end of the sort process, a single sort bin may be used to accumulate notes of a single denomination which have been determined to be of an appropriate fitness level, and which exhibit appropriate authenticating features.

In order for a currency processor to make note processing determinations that are used in separating and sorting notes, it detects features of the note that are considered to be indicative of the characteristics of the note. For example, among other things, features may be detected that help make determinations as to the authenticity or fitness of a note. After detection of a particular note feature, that feature is compared to a set standard, or "golden template" (hereinafter referred to by Applicants as a "template") to determine whether or not the feature is acceptable. Based on the comparison of the detected feature to the standard, an individual note may be identified for removal from circulation or sorted for future distribution.

One example of a note feature that may be indicative of a note's fitness is note color. A currency processing machine may detect a note's color to make a determination as to the fitness or authenticity of the note. Subsequently, the system compares the detected note color to a set standard/template for note color. Based on whether or not the detected note color is acceptable as compared to the standard, the note is either sorted to an unfit bin or sorted to a fit bin.

Comparing a detected note feature to a known acceptable standard in order to determine the fitness or authenticity of a note becomes problematic if there is more than one note printing source. A note printing source could be a particular note printing facility, or a specific note printing press, for example. Processing determinations become difficult with multiple printing sources because each printing source may have a different range of acceptable values for a particular note feature, such as note color. For example, with currency processors of the prior art, each note's detected note color is compared to the same standard/template for note color, regardless of source. Consequently, any source-specific variation in note color would cause some perfectly good notes to be rejected and removed from circulation, or some unacceptable notes to be put back into circulation, depending on the template tolerance. Such variations in note features from one print source to another may be small, yet very significant for currency processing, because the note sorting errors can add tremendous printing and reissue costs.

Implementation of the Euro as the common currency in Europe illustrates the problems created by multiple currency printing sources. Several European countries will employ the Euro as the standard currency, and each participating country will print the Euro using its own currency printing capabilities. To illustrate the problem presented, consider two notes of the same denomination, one printed in Country A, the other printed in Country B. The note printed in A is printed using a different print process from that used in printing the same issue in B. Consequently, new notes printed from A are darker than new notes printed from B. Notes commonly change color with use, and note color is a feature considered in determining whether a particular note should be removed from circulation due to unacceptable fitness. Typically, notes get darker with use. Because notes get darker with use, a new note from A will appear to have a lower fitness level than a new note from B. However, with the Euro, a currency processing machine in A may be expected to process notes originally printed in either A or B.

Such a subtle difference in note color could have a tremendous impact on the performance of a currency processing system of the prior art. For example, if the range of standard acceptable note colors is set based on notes produced in B, then perfectly good notes from A could be rejected and removed from circulation for lack of fitness only because of the inherent darker color of notes produced from the print process used in A. By removing notes from circulation prematurely, the cost of maintaining the appropriate level of currency in circulation would greatly increase. On the other hand, if the range of standard acceptable note colors is adjusted to accommodate the full range of note colors produced from both A and B, then worn, discolored notes from B that should be rejected and removed from circulation for lack of fitness will remain in circulation. This creates a problem in that such soiled and discolored notes are more likely to be processed incorrectly by automated currency handling devices because of the difficulty in detecting note features necessary for proper sorting, identification, and tracking of notes. Discoloration, or color variations, may also make it more difficult to distinguish authentic notes from counterfeit notes. Another drawback is the simple fact that the public does not like discolored notes.

Note color is just one note feature that may vary by note printing source. The problem with prior art processors is compounded by the fact that many note features critical to currency processing may vary according to the printing source of the note. The problem is also compounded by the fact that multiple printing sources may exist, each with a different range of standard acceptable values for each note feature. Different Euro countries use different ink sources and even different printing methods to produce notes that look identical to the consumer, but exhibit different currency processing characteristics.

Consequently, a more flexible currency processing system is needed. The system should account for source-specific variations in note features to decrease the costs associated with prematurely removing currency from circulation. The system should also decrease the cost of remedying problems caused by circulation of counterfeit notes and notes no longer fit for commercial use. Further, the improved system should provide for more accurate accounting and tracking of notes with features that vary by printing source.

SUMMARY OF INVENTION

The present invention satisfies the need for source-specific note processing by establishing, for each detected note feature, a plurality of processing templates, each corresponding to a different note printing source. A processing template contains the acceptable range of values for a particular note feature. Each time a note feature is detected, the value assigned to that note feature is compared to the range of acceptable values for that feature using the appropriate template. The acceptable range of values for a particular note feature, defined by a particular template, corresponds to a particular note printing source. For example, if the detected note feature is note color and there are two or more note printing sources with different ranges of acceptable note colors, then a different processing template is established for each different acceptable range of note colors.

For each note processed, the present invention detects at least one unique identifier that may be used to associate the note with a particular note printing source. As with the detection of features necessary for making note processing determinations, the present invention employs detectors to collect the information necessary to determine the printing source of the note.

By accounting for source-specific variations in note features, the present invention minimizes the costs associated with prematurely removing currency from circulation. Another benefit is the decrease in costs associated with remedying problems caused by circulation of counterfeit notes and notes no longer fit for commercial use. In addition, the invention provides for more accurate accounting and tracking of notes.

BRIEF DESCRIPTION OF THE DRAWINGS

The novel features believed characteristic of the invention are set forth in the appended claims. The invention itself, however, as well as the preferred mode of use, further objectives and advantages thereof, will be best understood by reference to the following detailed description of illustrative embodiments when read in conjunction with the accompanying drawings, wherein:

DETAILED DESCRIPTION

Figure 1:
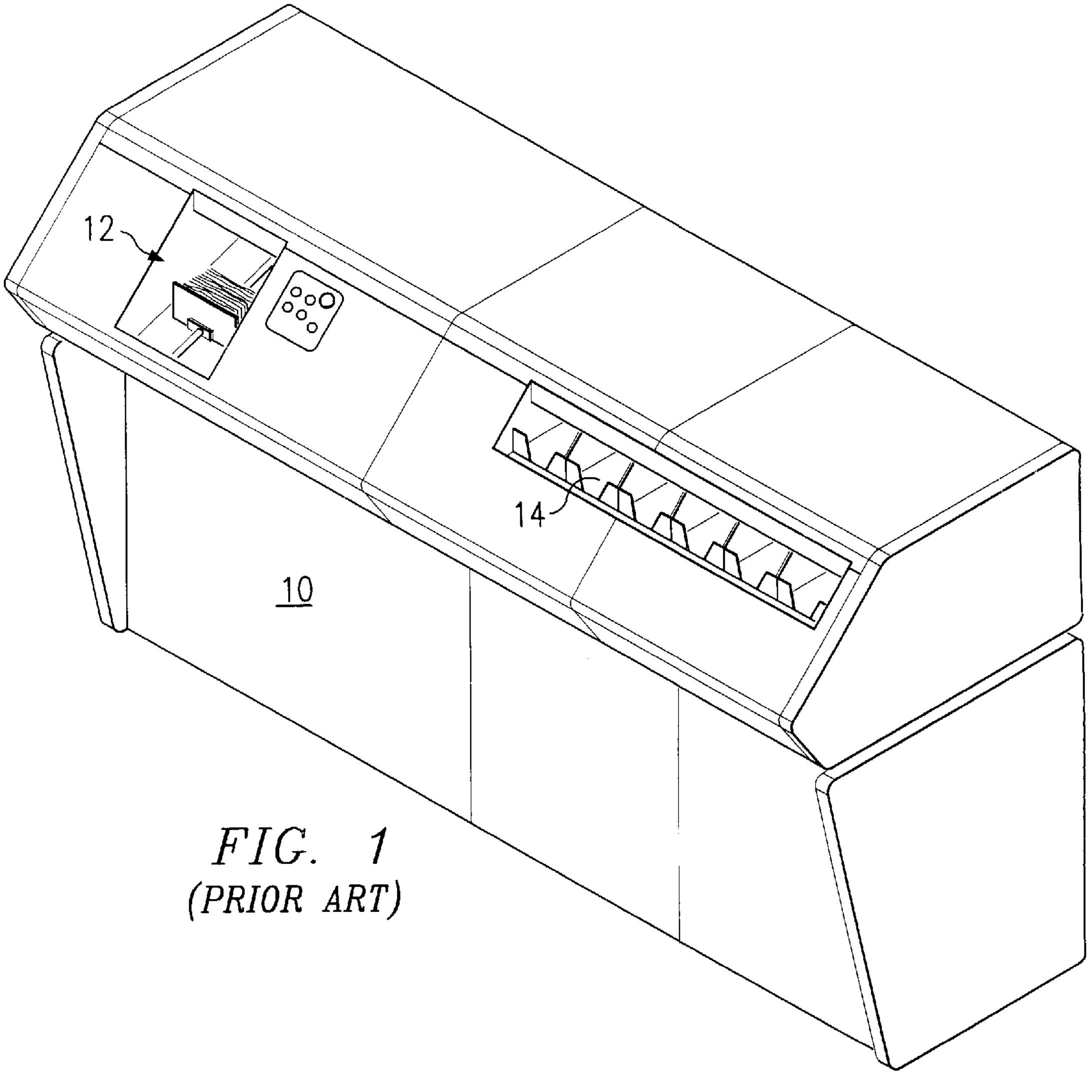
FIG. 1 (PRIOR ART)
FIG. 1 is an illustration of a currency processor of the prior art.
Figures 2, 3:
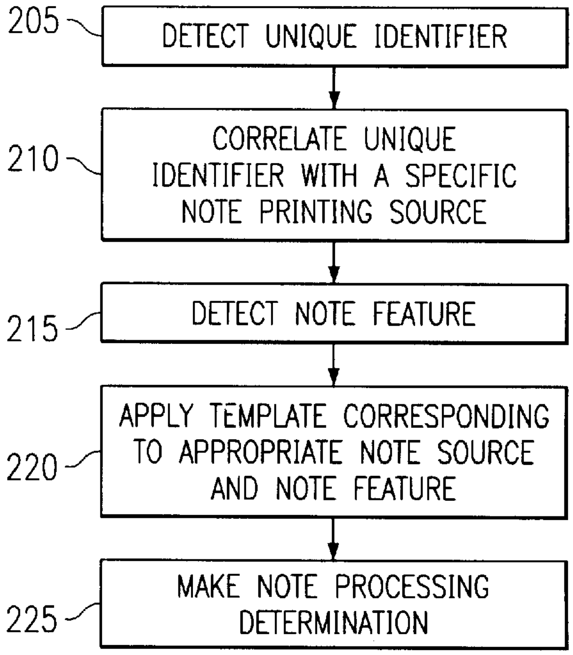
FIG. 2 is a flow chart reflecting a method of currency processing in accordance with the present invention.
FIG. 3 is a table illustrating an example in accordance with the present invention.

FIG. 2 is a flow chart reflecting a method of processing currency in accordance with the present invention. The chart assumes that a currency note has already been loaded into a currency processing machine such as the one illustrated in FIG. 1. For each note processed, at least one unique identifier is detected 205 that may be associated with a particular note printing source. Examples of unique identifiers include, but are not limited to, serial numbers, bar code sequences, and magnetic signatures. A unique identifier may be any mark or feature used to identify the particular printing source of a note. After a unique identifier is detected 205, it is then correlated to a specific note printing source 210. The printing source referred to herein may be a particular note printing facility, a specific note printing press, or any note source that may be identified via the unique features associated with the notes from that source.

After identifying the printing source 210, at least one note feature is detected 215. Note features used to make note processing determinations include, but are not limited to, fluorescence, phosphorescence, infrared characteristics, intaglio and offset print characteristics, acoustic signature, paper color, ink color, limpness, magnetic characteristics, light transmissivity or reflectivity, electric conductivity, and note image. The present invention could utilize any one feature by itself, or in combination with any of the other features. Using a combination of features could produce a more complete separation of notes. Further, any one of the features could be detected on more than one test area on the note. This would account for variations across the surface of the note.

A plurality of source-specific processing templates is created and programmed before any note processing occurs. A processing template is an accepted standard for a particular note feature to which data collected from the detection of note features may be compared. Each template includes the range of acceptable values for a particular detected note feature. The template and range of acceptable values further correspond to a specific note printing source. After detecting at least one note feature 215, a note processing template associated with the particular note source identified 210 is applied to the detected note feature 220. When the processing template is applied, the detected note feature is compared to the range of acceptable values corresponding to that particular feature. For example, if the detected note feature is note color, when the template is applied 220, the program will compare the detected note color to the range of acceptable note colors in the processing template corresponding to the identified note source.

Based on whether or not the detected note color falls within the range of acceptable values for note color, a note processing determination is made 225. In addition to determining a note's denomination, the note processing determination may be, for example, a determination of note authenticity or fitness, or a determination of both authenticity and fitness. At the note processing determination step 225, notes may be further directed through subsequent detection and determination steps, separated for removal from circulation, or sorted by denomination for future distribution. Consider, for example, a detected note color that, according to the template, is not within the range of acceptable note colors for a given note printing source. At the determination step, the note may be identified for removal from circulation based only on unacceptable note color, or the note may be further considered based on other detection and determination steps where the unacceptable note color is considered in combination with other factors to determine whether the note is acceptable for future distribution.

For each note processed there may be one or any combination of many steps in which the system detects a note feature, applies the appropriate source-specific template to the detected feature, and makes a note processing determination based on the application of the template to the detected feature. The criticality of each detected feature can be adjusted depending on the application. Further, processing determinations can be made in the aggregate based on two or more detected features or based on a weighted average result of the application of several templates to a single note.

Consider, for instance, the situation created by adoption of the Euro as the common currency in Europe. Despite the existence of common standards for notes of the same denomination, variations in note features indicating note authenticity and note fitness, that are significant in currency processing, may be caused by any number of factors. Such factors include, for instance, use of different printing equipment or methods, different paper sources, or different ink sources.

Assume that two notes of the same issue, one printed in country A and the other in country B, are to be processed by the same currency processing machine. Further assume that a predetermined serial number sequence is printed on the notes to indicate the printing source of each note, and that the machine will determine the fitness of each note by detecting both note paper color and note ink color. FIG. 3 contains the ranges of acceptable values, on a scale from 1 to 10, for the note paper color and note ink color of notes printed in A and B. Templates containing the information shown in FIG. 3 are created to account for source-specific variations in note paper color and note ink color. For purposes of this example, FIG. 3 indicates that the paper color of notes printed in A is acceptable, on a scale from 1 to 10, if the detected note color is less than or equal to 8. Notes printed in B are acceptable if the detected note color is less than 6. Also, on a scale from 1 to 10, notes printed in A have an acceptable ink color if the detected ink color is less than 5, and acceptable notes printed in B have an acceptable ink color if the detected ink color is less than or equal to 6.

Referring also to the flow chart in FIG. 2, after the two notes, one printed in A and the other printed in B, have been fed into the currency processing machine, the invention first detects a unique identifier 205, which in this case is a serial number sequence. After the serial number sequence is detected, it is correlated with a specific note printing source 210, in this case either A or B. Assume the first note processed is printed in A, and the second note processed is printed in B. Also assume that in this case the invention first detects note paper color, and then note ink color. After the serial number sequence of the first note is detected and correlated with the printing source in A, the invention detects the paper color of that note 215. When the system applies the template 220 for note color, the acceptable range of note colors contained in the template is compared to the detected note color. FIG. 3 indicates that the paper color must be less than or equal to 8 in order for it to be acceptable. Based on whether or not the detected paper color is less than or equal to 8, the invention makes a note processing determination 225. If, for instance, the note paper color is equal to 9, the note may be identified for rejection based only on the unacceptable note color, or the system may weigh the note color in combination with other detected note features before making a note processing determination. Once a note is fed into the currency processor, the note processing determinations and sorting, whether for removal from circulation or future distribution, typically occur after the note has traveled on the currency processor's high-speed conveyor through each detection step.

Continuing with the above example, after detection of the note's paper color, the note is directed to the ink color detection step. At the note ink color detection step, as with note paper color, the template containing the range of acceptable values for ink color on notes printed in A is applied to determine if the detected ink color is acceptable. FIG. 3 indicates, for instance, that ink color is acceptable if it is less than 5 on a scale from 1 to 10. The invention may use either note paper color or note ink color independently to identify a note for rejection and separation based on unacceptable fitness. On the other hand, the two detected features may be considered in combination in order to determine whether the note should be removed from circulation or sorted for future distribution. For instance, considering the note printed in A, a note with a detected paper color of 6 and detected ink color of 5 may be acceptable overall, even though the ink color is unacceptable. Alternatively, a note printed in A with a paper color of 8 and an ink color of 4 may be rejected as unacceptable overall, even though each of the detected features is independently acceptable.

According to the example, the note printed in B enters the system subsequent to the note printed in A. The second note's serial number sequence is detected 205 and correlated 210 with the note printing source in B. As with the note printed in A, the system performs the detection and determination steps 215–225 for note paper color and note ink color. For notes printed in B, the acceptable ranges for note paper color and note ink color are shown in FIG. 3. An advantage of the present invention is illustrated if a note color of 6 is detected from the note printed in B. Where a detected note paper color of 6 is acceptable for a note printed in A, a note printed in B with the same paper color is unacceptable. In other words, use of source-specific templates accounts for the fact that the note paper color of a new note printed in A may equal 6, while the note paper color of a new note printed in B may equal 3. In such a case the detected note feature alone is not determinative of the note's fitness or authenticity. Information about the printing source of the note is just as significant in making note processing determinations. A detected paper color of 6 on a note printed in B may indicate that the note is worn and soiled to the point that it should be removed from circulation for lack of fitness. A detected paper color of 6 on a note printed in A indicates that the note's fitness is acceptable and that it should be sorted for future distribution. By using source-specific processing templates to account for such source-specific variations in note features, as illustrated by the preceding example, the present invention minimizes premature removal of currency from circulation, minimizes problems caused by circulation of counterfeit notes and notes no longer fit for commercial use, and provides more accurate accounting and tracking of notes.

Although the preceding hypothetical supposes the use of two detected note features in order to determine note fitness, a sequence involving any number of note printing sources, and any number and combination of detection and determination steps, could be used to determine note fitness or note authenticity, or both note fitness and authenticity. In addition, each detected note feature may be weighted differently in the determination of a note's overall fitness or authenticity.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

What is claimed is:

1. A method for note processing comprising the steps of:

a) detecting at least one unique identifier of each of a plurality of notes processed wherein the plurality of notes are of the same denomination and general appearance with small variations in appearance due to differences in printing source;

b) correlating said detected at least one unique identifier with the printing source for each note processed;

c) detecting at least one note feature of each note processed;

d) selecting a processing template for said at least one detected note feature for each note processed, said processing template selected based on said printing source;

e) applying said processing template to said at least one detected note feature for each note processed; and f) making a note processing determination based on the application of said processing template to said at least one detected note feature of each note processed.

2. The method of claim 1 wherein said at least one note feature of step c) is selected from the group consisting of fluorescence, phosphorescence, infrared characteristics, intaglio print characteristics, offset print characteristics, acoustic signature, paper color, ink color, limpness, magnetic characteristics, light transmissivity, light reflectivity, electric conductivity, and note image.

3. The method of claim 1 wherein said at least one unique identifier of step a) comprises a note serial number.

4. The method of claim 1 wherein said at least one unique identifier of step a) comprises a bar code sequence.

5. The method of claim 1 wherein said at least one unique identifier of step a) comprises a magnetic signature.

6. The method of claim 1 wherein said printing source of step b) comprises a note printing facility.

7. The method of claim 1 wherein said printing source of step b) comprises a specific note printing press.

8. The method of claim 1 wherein said note processing determination of step f) comprises an authentication determination.

9. The method of claim 1 wherein said note processing determination of step f) comprises a fitness determination.

10. A method for note processing comprising the steps of:

(a) establishing a plurality of source specific processing templates for at least one detected unique note feature;

(b) detecting said at least one detected unique note feature for each of a plurality of notes processed wherein the plurality of notes are of the same denomination and general appearance with small variations in appearance due to differences in printing source;

(c) identifying the specific source for each note processed; and (d) applying a source specific processing template to said at least one detected unique note feature for each note processed based on said specific source identified.

11. The method of claim 10 wherein said at least one detected note feature of step a) is selected from the group consisting of fluorescence, phosphorescence, infrared characteristics, intaglio print characteristics, offset print characteristics, acoustic signature, paper color, ink color, limpness, magnetic characteristics, light transmissivity, light reflectivity, electric conductivity, and note image.

12. The method of claim 10 wherein the identification of step c) comprises reading a note's serial number and correlating said serial number to said specific source.

13. The method of claim 10 wherein the identification of step c) comprises reading a note's bar code sequence and correlating said note's bar code sequence to said specific source.

14. The method of claim 10 wherein the identification of step c) comprises reading a note's magnetic signature and correlating said note's magnetic signature to said specific source.

15. The method of claim 10 wherein said specific source of step c) comprises a note printing facility.

16. The method of claim 10 wherein said specific source of step c) comprises a specific note printing press.

17. The method of claim 10 further comprising the steps of:

e) determining the fitness level of a note based on a comparison of one of said source specific processing templates to said at least one detected note feature.

18. The method of claim 10 further comprising the steps of:

e) determining the authenticity of a note based on a comparison of one of said source specific processing templates to said at least one detected note feature.

19. A note processing machine comprising:

at least one note feature detector;

a means for identifying a printing source of each of a plurality of notes processed based on a unique note feature, wherein the plurality of notes are of the same denomination and general appearance with small variations in appearance due to differences in printing source;

a means for correlating said identified printing source with a source specific processing template; and a means for applying said source specific processing template to a note feature detected by said at least one note feature detector.

20. The note processing machine of claim 19 wherein said at least one note feature detector comprises a detector selected from the group consisting of a fluorescence detector, phosphorescence detector, infrared characteristics detector, intaglio print characteristics detector, offset print characteristics detector, acoustic signature detector, paper color detector, ink color detector, limpness detector, magnetic characteristics detector, light transmissivity detector, light reflectivity detector, electric conductivity detector, and note image detector.

21. The note processing machine of claim 19 wherein said means for identifying said printing source of each processed note comprises reading a serial number for each note and correlating said serial number to said printing source.

22. The note processing machine of claim 19 wherein said means for identifying said printing source of each processed note comprises reading a bar code sequence for each note and correlating said bar code sequence to said printing source.

23. The note processing machine of claim 19 wherein said means for identifying said printing source of each processed note comprises reading a magnetic signature for each note and correlating said magnetic signature to said printing source.

24. The note procession machine of claim 19 wherein said printing source comprises a note printing facility.

25. The note processing machine of claim 19 wherein said printing source comprises a specific note printing press.

26. The note processing machine of claim 19 wherein fitness level determinations are made for each processed note based on the application of said source specific processing template to said each processed note.

27. The note processing machine of claim 19 wherein note authenticity is determined for each processed note based.on the application of said source specific processing template to said each processed note.

* * * * *